United States Patent [19]

Wilson

[11] Patent Number: 4,901,217
[45] Date of Patent: Feb. 13, 1990

[54] DIGITAL INPUT POWER SUPPLY AND METHOD

[75] Inventor: David Wilson, Los Altos, Calif.

[73] Assignee: Apple Computer, Inc., Cupertino, Calif.

[21] Appl. No.: 310,472

[22] Filed: Feb. 13, 1989

Related U.S. Application Data

[63] Continuation of Ser. No. 127,188, Dec. 1, 1987, abandoned.

[51] Int. Cl.[4] ............................................. H02M 7/06
[52] U.S. Cl. .................................... 363/126; 307/261; 364/200
[58] Field of Search ...................... 307/138, 261, 311; 361/245; 363/45, 126, 147; 328/26

[56] References Cited

U.S. PATENT DOCUMENTS

| 2,481,644 | 9/1949 | Callaway | 307/321 |
| 4,086,624 | 4/1978 | Iraley | 307/138 |
| 4,245,294 | 1/1981 | Brolin | 363/126 |

FOREIGN PATENT DOCUMENTS 3503205  8/1986  Fed. Rep. of Germany .

Primary Examiner—William H. Beha, Jr.
Attorney, Agent, or Firm—Blakeley, Sokoloff, Taylor & Zafman

[57] ABSTRACT

A full-wave rectifier circuit is coupled to a pair of differential signal lines emanating from a computer. The differential signal lines which carry digital data information having a serial protocol scheme is tapped by the full-wave bridge rectifier to provide a power supply voltage to power various circuits coupled to the power supply. This scheme permits an interface unit to a serial protocol scheme of a computer to power itself from the data lines.

11 Claims, 1 Drawing Sheet

U.S. Patent        Feb. 13, 1990        4,901,217
FIG_1
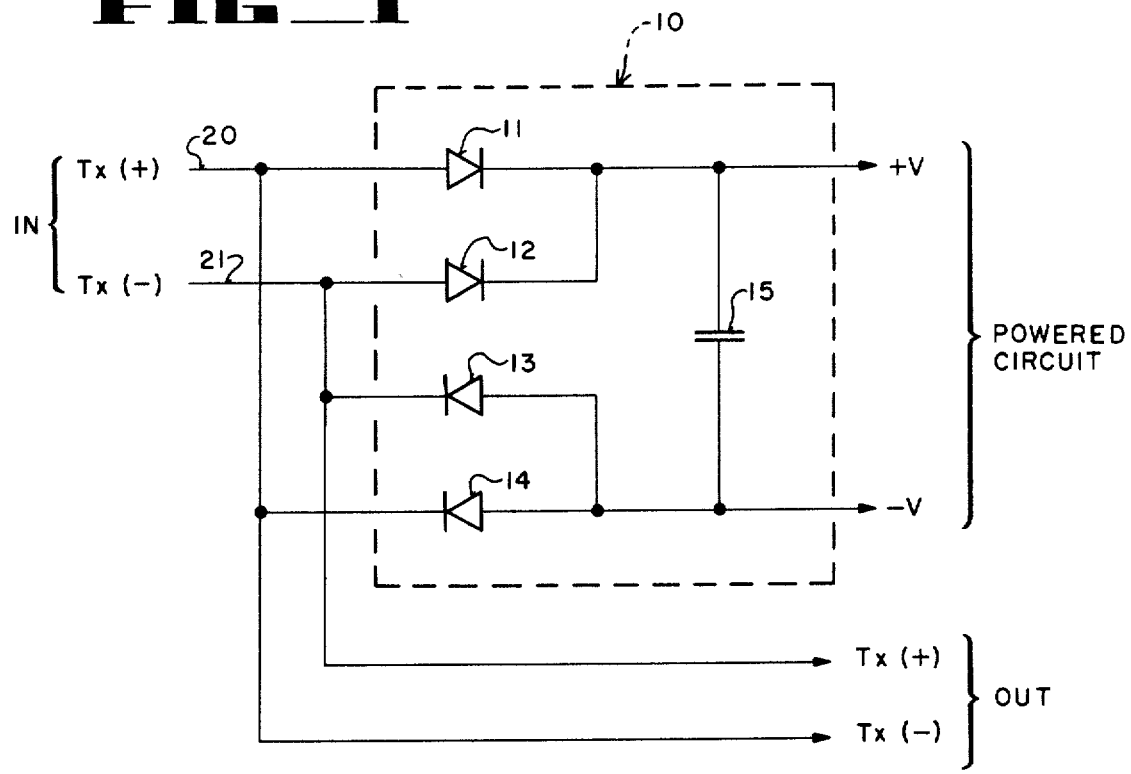
FIG_2
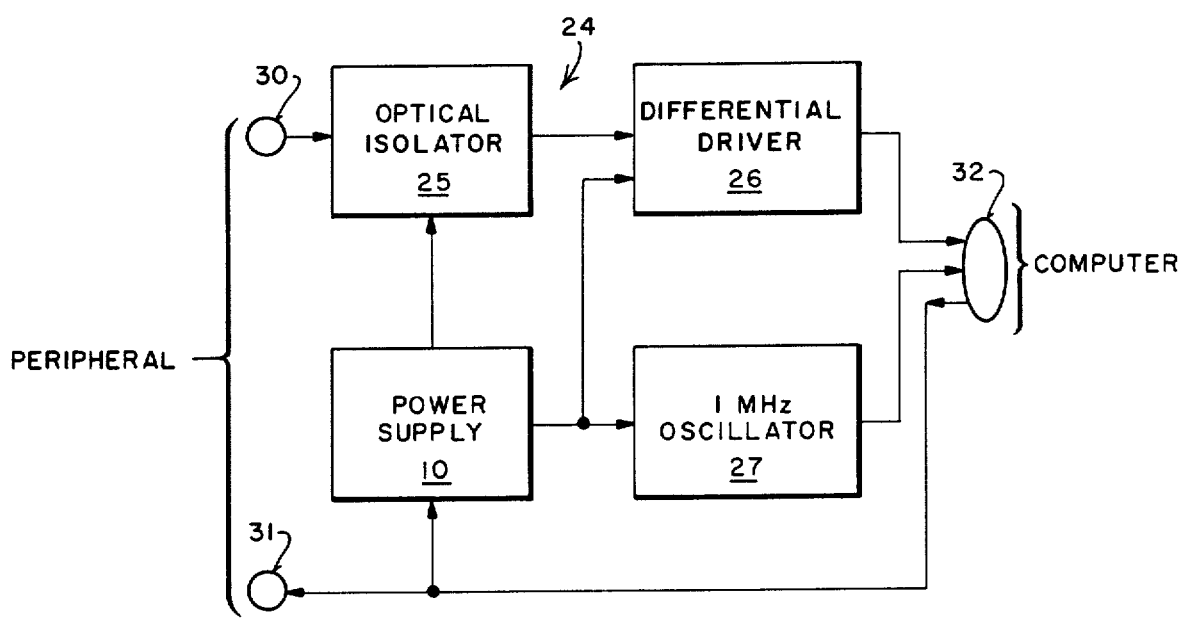

DIGITAL INPUT POWER SUPPLY AND METHOD

This is a continuation of application Ser. No. 127,188, filed Dec. 1, 1987, now abandoned.

FIELD OF THE INVENTION

The present invention relates to the field of electronic power supplies.

BACKGROUND OF THE INVENTION

Conversion of alternating current (AC) power to direct current (DC) power is well-known in the prior art. One class of AC to DC power converting circuits utilizes diodes to provide full-wave rectification. Usually, a filter circuit is coupled to the output of the rectifier to reduce the ripple of the rectified output.

Although various power supply circuits are well-known in the prior art, typically these circuits are designed to convert single or multiple phase transmission line AC voltages to DC voltages. In these instances, AC power lines, such as ordinary house current, are coupled as inputs to the power supply. Most devices which require a DC voltage to operate have power supply circuitry which are coupled to the AC lines.

This additional power requirement poses troublesome connection concerns when a device is coupled to operate with present day table-top personal computers by increasing the number of cables and power lines associated with the overall computer network. What is desired is to have the additional units or peripherals which can be coupled to existing terminations and derive necessary power from such connections. That is, if an add-on unit is capable of being driven by existing communication signals, such as data signals, then these units can operate by sourcing power from existing terminals of existing units and will not require additional plugs or power lines.

SUMMARY OF THE INVENTION

The present invention describes a full-wave rectifier circuit which derives its input power from a digital signal. An add-on unit which includes the power supply of the present invention is coupled to a serial interface port of a desk-top personal computer. Digital signals present at the serial interface port are passed through the add-on unit, but are also coupled to the power supply such that a full-wave bridge rectifier taps the digital signals line to provide DC voltages for powering various circuits present in the add-on unit. In the preferred embodiment, an RS-422 compatible serial port is utilized and a differential signal of +3 volts and −3 volts is impressed on the data lines to provide a +5 volt DC output from the power supply.

BRIEF DESCRIPTION OF THE DRAWINGS

FIG. 1 is a circuit schematic diagram of a power supply of the present invention.

FIG. 2 is a block schematic diagram showing a particular peripheral interface which is powered by the power supply of the present invention.

DETAILED DESCRIPTION OF THE PRESENT INVENTION

A power supply circuit for converting a digital signal to a DC voltage is described. In the following description, numerous specific details are set forth, such as specific serial interface protocols, etc., in order to provide a thorough understanding of the present invention. However, it will be obvious to one skilled in the art that the present invention may be practiced without these specific details. In other instances, well-known circuits have not been described in detail in order not to unnecessarily obscure the present invention.

Referring to FIG. 1, a power supply circuit 10 of the present invention is shown. A pair of input lines 20 and 21 are coupled to receive digital input signals labeled Tx(+) and Tx(−). A pair of output lines labeled +V and −V provide DC voltage as an output from circuit 10. A first diode 11 is coupled between input line 20 and output line +V. A second diode is coupled between input line 21 and output line +V. A third diode 13 is coupled between input line 21 and output line −V and a fourth diode 14 is coupled between input line 20 and output line −V. Diodes are arranged such that cathodes of diodes 11 and 12 are coupled to output line +V and anodes of diodes 13 and 14 are coupled to output line −V, such that the four diodes 11–14 operate as a full-wave bridge rectifier by rectifying the signal on input lines 20 and 21. A capacitor 15 is coupled across the output +V and −V to provide the filtering of the output voltage to reduce output ripple.

In the preferred embodiment, signals Tx(+) and Tx(−) on input lines 20 and 21 are differential signals switching between approximately +3 volts and −3 volts. That is, when input line 20 is at +3 volts and input line 21 is at −3 volts, these voltage levels exemplify one digital state; and when input line 20 is at −3 volts and input line 21 is at +3 volts these signals exemplify the other digital state. The input lines 20 and 21 are also coupled to provide a throughput of Tx(+) and Tx(−).

Initially, power supply circuit 10 appears as a short circuit to the input lines 20 and 21, due to the discharged state of capacitor 15. Once the digital signals Tx(+) and Tx(−) have been impressed across lines 20 and 21, capacitor 15 charges and the power supply circuit 10 becomes transparent to the input lines 20 and 21. That is, the presence of circuit 10 has neglible effect on lines 20 and 21, thereby allowing signals Tx(+) and Tx(−) to be coupled through. Digital transmission is achieved provided the combined load of the powered circuit and the destination circuit of the output Tx(+) and Tx(−) are within power requirements of drivers providing the input Tx(+) and Tx(−)on lines 20 and 21.

Further, the absolute voltage levels of +3 and −3 volts are arbitrary. However, the absolute value of the difference of the two voltages must be approximately equal for the circuit 10 to operate properly.

An overall understanding of the purpose of power supply circuit 10 is shown in the block diagram of FIG. 2. FIG. 2 shows a specific application of the power supply of the present invention. However, it is to be appreciated that a variety of circuits can be powered from the power supply of the present invention. Three terminals 30–32 are shown as part of interface unit 24. Terminal 32 interconnects to a computer and terminals 30 and 31 interconnect to a peripheral unit. Although terminals 30 and 31 are shown coupled to a single peripheral, each of terminals 30 and 31 can readily connect to a different peripheral unit. As used in the preferred embodiment, terminal 30 accepts signals from the peripheral unit and terminal 31 provides signals to the peripheral unit. Terminal 32 on the other hand provides both input and output to the computer. Terminal 32 of the preferred embodiment provides RS-422 compatible interface to a computer, although other differential signal inputs can be easily adapted. Further terminal 32 need not be limited to a serial port and can be configured for use with parallel ports. Further, power supply circuit 10 typically will generate less than five volts when coupled to run on industry standard RS-422.

The power supply circuit 10 is used to power optical isolator 25, differential driver 26 and a one megahertz oscillator 27 which comprise the interface unit 24 between the computer and the peripheral unit. Signals from the peripheral unit are coupled to the optical isolator 25 through terminal 30. Optical isolator 25 provides isolation of the signal from the peripheral unit. The output of the optical isolator 25 is coupled to a differential driver 26 for converting the signal from the peripheral unit to a differential signal for output to the computer through terminal 32. Terminal 32 also is coupled to provide an output of a one megahertz oscillator to the computer, wherein the one megahertz signal can be used for a variety of purposes, such as to power a microphone circuit.

Signals from the computer are coupled as inputs to terminal 32 and passed to terminal 31 for output to the peripheral unit. Digital signals Tx(+) and Tx(−), which comprise a portion of these signals from the computer, are also coupled to the power supply 10. The signals Tx(+) and Tx(−) are equivalent to those signals on lines 20 and 21 of FIG. 1. Therefore the interface unit 24 provides the necessary interface between the peripheral and the computer and further provides its own power supply voltage without additional power connections.

As used in the preferred embodiment, terminal 32 couples RS-422 compatible signals to and from computers manufactured by Apple Computer, Inc. of Cupertino, Calif. A single perpheral unit is coupled to terminals 30 and 31, wherein these terminals 30-31 provide an internationally accepted communication standard known as "musical instrument digital interface" (MIDI).

MIDI is a 31.25 kilobaud serial transmission protocol in which signals are unidirectional and optically isolated. The optical isolator 25 eliminates ground loops and provides a balanced differential transmission due to differential driver 26. Input digital signals Tx(+) and Tx(−) are generated by the computer and are derived from signals present on a proprietary communication protocol known as Apple Talk TM. The 1 MHz oscillator supplies a clock signal to the computer necessary to support the 31.25 transmission rate.

Thus a digital signal input power supply is described.

I claim:

1. A circuit, coupled between a peripheral unit and a personal computer, for converting a differential digital signal originating from said personal computer, to a DC power supply voltage, switching between a first voltage and a second voltage, wherein said first voltage represents a first digital state and said second voltage represents a second digital state, comprising:
a pair of input terminals at a said circuit coupled to receive said differential digital signal from said personal computer;
a pair of output terminals from said circuit coupled to provide said DC power supply voltage;
rectifier means coupled between said input terminals of said circuit and said output terminals of said circuit for providing conversion of said differential digital signal to said DC power supply voltage;
said personal computer having output means to send said differential digital signal to said circuit; said differential digital signal has said first and second voltages at approximately equal magnitude about a reference value, so as to provide a substantially continuous DC power supply voltage from said output terminals of said circuit.

2. The circuit of claim 1 wherein said differential signal is for transferring of digital data between a personal computer and peripheral unit; and wherein said circuit provides said DC power supply voltage without interfering with said transferring of digital data.

3. The circuit of claim 2 wherein said reference value is zero volts.

4. The circuit of claim 2 wherein said transferring of digital data is compatible with RS-422 protocol.

5. A circuit, coupled between a peripheral unit and a personal computer, for converting a differential digital signal, originating from said personal computer which is used to transfer data, to a DC power supply voltage, said differential digital signal being switched between first and second voltages which correspond to first and second digital states, respectively, comprising;
a pair of input terminals at said circuit coupled to receive said differential signal, wherein said differential digital signal switches between a positive voltage and a negative voltage, but magnitude of said positive and negative voltages are approximately equal about a zero reference;
a pair of output terminals from said circuit coupled to provide said DC power supply voltage as an output;
a first diode coupled between a first of said pair of input terminals and a first of said pair of output terminals;
a second diode coupled between a second of said pair of input terminals and said first of said output terminals;
a third diode coupled between said second of said input terminals and a second of said pair of output terminals;
a fourth diode coupled between said first of said input terminals and said second of said output terminals;
wherein said four diodes operate to function as a full-wave rectifier rectifying said differential digital signal to provide said substantially continuous DC power supply voltage;
said personal computer having output means to send said differential digital signal to said circuit;
whereby a source of power is provided at the output terminal of said circuit, by said differential digital signal originating from said output means of said personal computer.

6. The circuit of claim 5 wherein said differential digital signal is compatible with RS-422 protocol.

7. The circuit of claim 6 wherein said differential digital signal switches between −3 volts and +3 volts to provide approximately +5 volts DC from said pair of output terminals.

8. The circuit of claim 7 wherein a filter capacitor is coupled across said output terminals to reduce ripple of said DC power supply voltage.

9. The circuit of claim 5 further including a pair of output signal lines coupled to said pair of input terminals to output said differential digital signal.

10. The circuit of claim 8 further including a pair of output signal lines coupled to said pair of input terminals to output said differential signal.

11. A method of coupling a full-wave rectifier circuit between a peripheral unit and a personal computer and for converting a differential digital signal, which originates from an output means of said personal computer, to a continuous DC power supply voltage, including the steps of;

coupling said output means of said personal computer to differential digital signal lines;

coupling input terminals of said full-wave rectifier circuit to other end of said differential signal lines;

providing data transfer between said personal computer and said full-wave rectifier circuit across said differential digital signal lines;

said full-wave rectifier circuit receiving said differential digital signal at said input terminals, rectifying said differential digital signal to provide a substantially continuous DC power supply voltage from said output terminals of said full-wave rectifier circuit.

* * * * *